(No Model.)

2 Sheets—Sheet 1.

W. E. NICKERSON.
CONTROLLER FOR ELEVATORS.

No. 404,013. Patented May 28, 1889.

WITNESSES.
Frank L. Parker.
Matthew M. Blunt.

INVENTOR.
William E. Nickerson (No Model.) 2 Sheets—Sheet 2.

W. E. NICKERSON.
CONTROLLER FOR ELEVATORS.

No. 404,013. Patented May 28, 1889.

WITNESSES.
Frank G. Parker
Matthew M. Blunt

INVENTOR.
William E. Nickerson

UNITED STATES PATENT OFFICE.

WILLIAM E. NICKERSON, OF CAMBRIDGE, MASSACHUSETTS.

CONTROLLER FOR ELEVATORS.

SPECIFICATION forming part of Letters Patent No. 404,013, dated May 28, 1889.

Application filed February 11, 1889. Serial No. 299,467. (No model.)

*To all whom it may concern:*

Be it known that I, WILLIAM EMERY NICKERSON, of Cambridge, in the county of Middlesex and State of Massachusetts, have invented certain new and useful Improvements in Controllers for Elevators, of which the following, taken in connection with the accompanying drawings, is a specification.

My invention relates to a device in which a hand-lever within an elevator-carriage is used in connection with ropes and pulleys to actuate the elevator-controlling mechanism, the object being to simplify the construction, and also to make it semi-automatic in its action, thus assisting the attendant in his work and facilitating the management of an elevator. This object I obtain by the mechanism shown in the accompanying drawings, in which—

Figure 1:
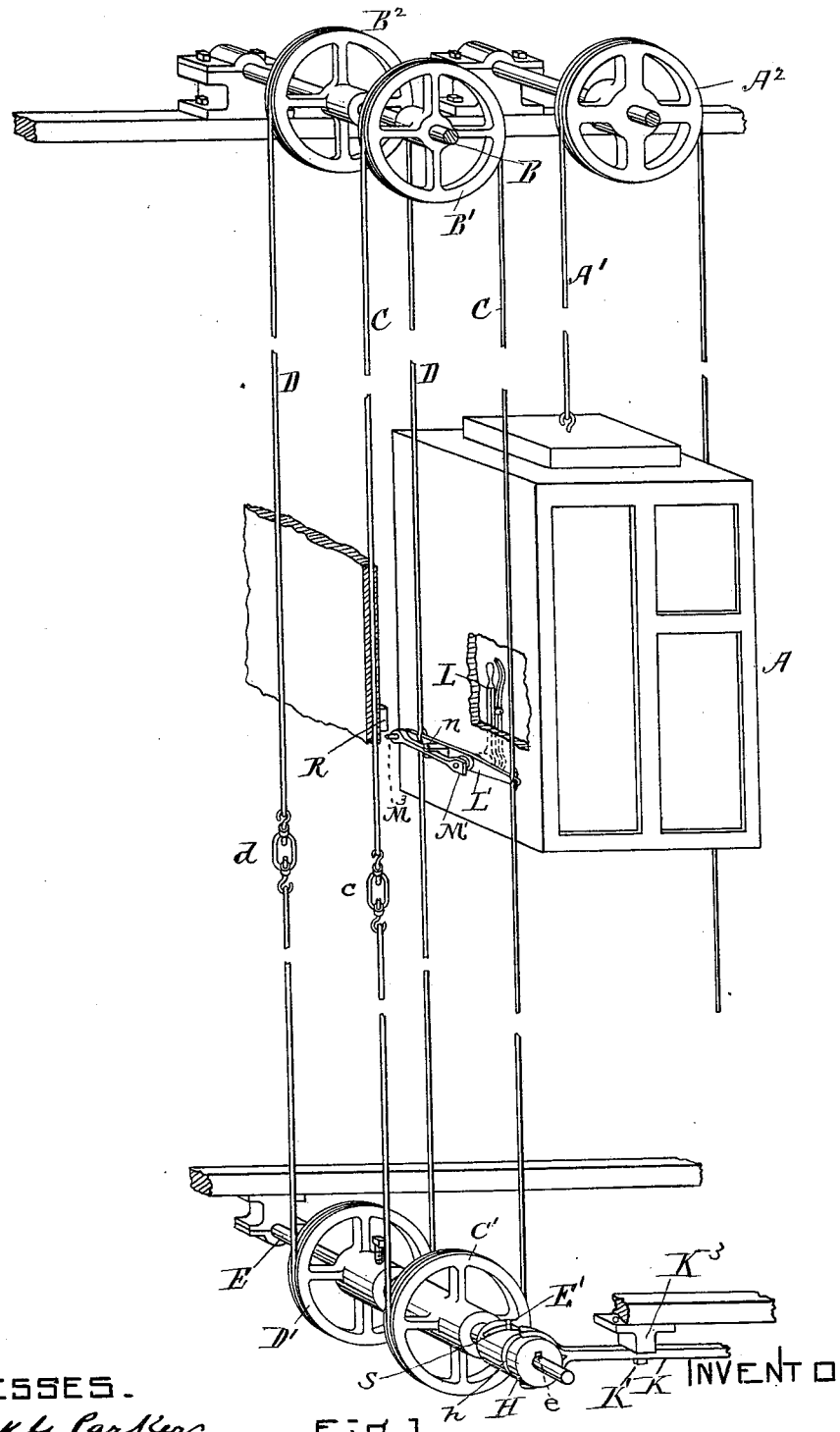
Figure 2:
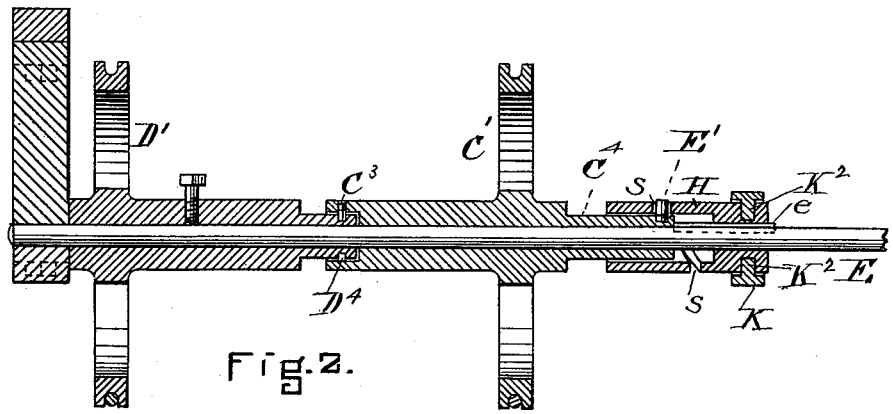
Figure 3:
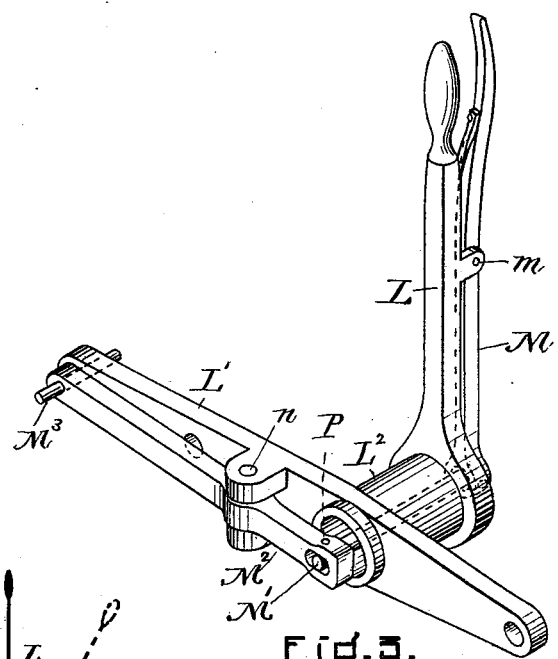
Figure 5:
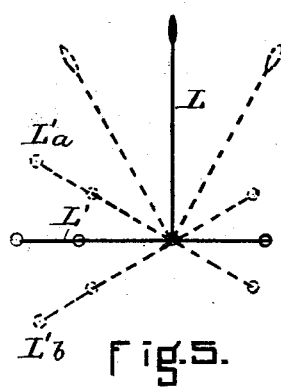
Figure 4:
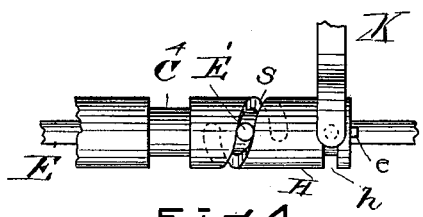

Figure 1 is a perspective view of one of my devices as applied to an elevator-carriage of ordinary construction. Fig. 2 is a vertical section taken longitudinally through the lower pulley-shaft and its connected parts. Fig. 3 is a perspective view of the hand-lever and the parts directly connected to it. Fig. 4 is a view of a detail, and Fig. 5 is a diagrammatical view to illustrate the movements of the hand-lever.

A, Fig. 1, is an elevator-carriage, which has a hoisting-rope, A', and pulley $A^2$ of the ordinary description.

B represents a shaft located at the top of the elevator-well, and has upon it two pulleys, one of which, $B^2$, is fixed to the shaft, while the other, B', is free to revolve on the shaft.

The pulley $B^2$ on the shaft B is connected by a rope belt, D, to a pulley, D', fixed upon the shaft E at the bottom of the well-room, so that the shafts B and E must revolve in unison with each other. The loose pulley B' on the shaft B is connected by a rope belt, C, to the loose pulley C' on the shaft E, so that the two pulleys B' and C' will always rotate together whenever the rope C moves.

The pulleys B' $B^2$ and C' D' are all made of the same size, or are so proportioned that the movement of the two pulleys C' and D' on the shaft E be the same as to period of rotation.

The two belt-ropes D and C are attached to a lever, L', Figs. 1 and 2, said lever L' being attached by a pivotal connection to the carriage A, as shown in Fig. 1, one at each end, so that as long as the lever L' is stationary in relation to the carriage A any motion of the carriage A will cause the rope belts C and D to traverse over the pulleys B' $B^2$ D' C', and cause them all to rotate, and as the pulleys $B^2$ and D' are fixed upon their respective shafts B and E, it is evident that the two shafts must rotate together, and also that the two pulleys B' and C' must operate together—that is, rotate as the carriage A moves—but that they may be to a limited extent independent of the motion of the shafts B and E, for if (for instance supposing the carriage stationary) we cause the lever L' to swing on its center $L^2$, one end of it going down and the other going up, then the rope belts D and C will move in opposite directions and cause the pulleys B' and $B^2$ to rotate in opposite directions, and also the pulleys D' and C' on the lower shaft, E, to rotate in opposite directions, and as the pulley D' is fixed to the shaft E it follows that the shaft E will rotate in a direction opposite to the motion of the pulley C'. Again, if we suppose the carriage A in motion, then a motion of the lever L' on its rocker-shaft $L^2$ will cause the pulleys C' and D' to have a motion in relation to each other—that is, one will rotate faster than the other for a limited time—that is, while the lever L' is in motion. It is upon this difference of rotation, position, or relation, as the case may be, that the working of my device depends, as will be explained hereinafter.

The hub of the pulley C' is recessed at its end, as shown in Fig. 2, so as to embrace the neck of the hub of the pulley D', the two pulleys C' and D' being held together by means of a pin, $C^3$, the inner end of which works in an annular groove, $D^4$, made for it in the neck of the hub of the pulley D, so that, although the two pulleys D' and C' are free to revolve independently of each other, they cannot move longitudinally on the shaft E—that is, as the pulley D' is fixed rigidly to the shaft it follows that the pulley C' is also fixed as to its longitudinal position on the shaft E.

H, Figs. 1 and 2, is a longitudinally-movable sleeve on the shaft E, and made to revolve with it by a key and keyway, e, and has in it a spiral slot, S, in which a pin, E', affixed in the neck C⁴ of the hub of the pulley C', works, and as the hub of the pulley C' and the pin E' are fixed, it is evident that a positive or relative movement of the hub of the pulley C on the shaft E (in its rotation) must, acting through the pin E' and spiral slot S, cause a corresponding longitudinal movement of the sleeve H. This movement of the sleeve H is communicated to the forked lever K, Fig. 1, by means of an annular groove, $h$, in the sleeve H and pins or projections K²K² on the forks of the lever K. The lever K is pivoted at K' to a fixed block, K³, and serves to operate the direct controlling mechanism of the elevator.

The hand-lever L, Fig. 3, is located within the carriage, and is fixed to a rocker-shaft, L², upon the outer end of which the rope-controlling lever L' (already referred to) is attached. The hand-lever L has connected to it by a pivot, $m$, a stopping or controlling lever, M. This lever M is connected at its lower end to a rod, M', which passes longitudinally through the rocker-shaft L², and is connected at its inner end by a pin, P, to a lever, M²; the lever M² being pivoted by the pin $n$ to the lever L', and has upon its end a stud, M³. By moving the lever M in or out a corresponding movement is given to the stud M³—that is, it may be back against the lever L', in which position it is inoperative, or it may be thrown out so as to come in contact with a fixed stop in the elevator-well to stop the carriage, as will be explained.

R, Fig. 1, is a stop fixed to the walls of the elevator-well, one at each floor and one of a modified form at the top and bottom. These stops are so placed and made that when the elevator approaches a floor at which it is to stop the stud M³ on the lever M² will (if the lever M² is thrown out) come in contact with the stop R, and thus cause the lever M², together with the lever L', to move on its axis of rotation, and thus cause the rope belts D and C to act (through the pulleys D' C', shaft E, and sleeve H and lever K) on the controlling mechanism, and thus stop the carriage. The lengths of the rope D and C may be adjusted by the turn-buckles $d$ and $c$, Fig. 1.

Fig. 5 is a diagram intended to illustrate the action of the lever L' when moved either by the hand-lever L or by the action of the stops R, acting through the stud M³.

When the hand-lever L is perpendicular and the lever L' horizontal, then the ropes C and D will hold the pulleys D' and C', and through them the shaft E and sleeve H, in such a position that the said sleeve H will be in the middle position of its path of motion, and will hold the lever K in such a position as to disconnect the hoisting-engine from its source of motion. The end of the lever L' to which the stud device M³ M² is attached is always up when the carriage is ascending, as indicated at L' $a$ in Fig. 5, and as soon as the stud M³ comes in contact with the stop R the lever L' will be moved back to its level position, as indicated in full lines, and the carriage will stop.

To cause the carriage to descend, the lever L' is turned as indicated at L' $b$, Fig. 5—that is, the stud end is down. Now, as the descending carriage nears a floor or stopping-place, the stud in coming in contact with a stop, R, will cause the lever to assume a horizontal position and stop the carriage, as already explained.

The stud M³, controlling lever M, may be held in one of its positions—that is, with the stud M³ out or with it in, as may be desired—by a spring connected to the hand-lever L. By so making the rocker-shaft L² that it may have a longitudinal motion in its housing the lever M and its adjuncts can be omitted and a stud be applied directly to the end of the lever L', which the attendant can cause to operate by pushing the hand-lever L, its rocker-shaft L², and the lever L' bodily outward, so as to cause the stud or end of the lever L' to come in contact with the stop R.

It is obvious that instead of having simple pulleys D' C', as shown, winding-drums can be substituted, the ropes being fastened to prevent slippage, and also that a variety of devices for utilizing the relative motion between the pulleys or drums B' and C' for operating the controlling mechanism can be used.

I claim—

1. In an elevator, the combination of the carriage A, hoisting-rope A', ropes D and C, lever L', having the rope D attached to it on one side of its pivotal point and the rope C attached on the other side of said pivotal point, and the pulleys B² and B', with the pulleys D' and C', one of which is rigidly attached to the shaft E and the other loosely mounted upon said shaft and adapted by a rotary movement relative to the first to increase and diminish the axial distance between them, the shaft E, and a system of levers to convey the axial longitudinal movement of the loosely-mounted pulley to the controlling mechanism of the hoisting apparatus, substantially as and for the purpose set forth.

2. In an elevator-controlling device, the combination of the hand-lever L, controlling-lever M, rod M', and lever M², having a stud, M³, and the lever L', with the stop R, affixed to the well-room of the elevator, substantially as and for the purpose set forth.

WILLIAM E. NICKERSON.

Witnesses:
FRANK G. PARKER,
MATTHEW M. BLUNT.